United States Patent Office 3,543,005
Patented Nov. 24, 1970

3,543,005
TEMPERATURE CONTROL SYSTEM FOR AN
ELECTRICALLY HEATED BLANKET
Leslie Andrew Kelemen, 142 Bellevue Road, Bellevue Hill,
New South Wales, Australia
Filed May 18, 1967, Ser. No. 639,435
Int. Cl. H05b 1/02
U.S. Cl. 219—494                                                  8 Claims

ABSTRACT OF THE DISCLOSURE

An electronic control unit is disclosed for regulating the temperature of electric blankets. The heat of the control unit may be a silicon controlled rectifier or a triac. These are shown in both half wave and full wave circuits. A temperature controlled switch bypasses the control unit to provide for rapid pre-heat. Once the operating range is reached this switch is opened and the electronic control unit takes over.

---

This invention relates to control units of the type attached to electric blankets or the like which latter in use are raised to an initial temperature and are provided with means capable of regulating this temperature within wide limits.

The problem to be solved in the heating of electric blankets and the like is of a two-fold nature:

(1) They call for a maximum safe temperature in the shortest time practicable.

(2) They must be provided with satisfactory means to regulate that safe temperature uniformly within wide limits.

We consider now those desiderata and what has been done up to date:

To reach the maximum temperature (say 110° F.) in the shortest time, the wattage per square foot has to be increased, which is quite simple, but to achieve that objective while obeying safety regulations, involves certain complications.

In Australia one safety limit of 7 watts/sq. ft. is prescribed. At this wattage, about 45 mins. are required to reach a temperature of 100–110° F. To reach this temperature in a shorter period of time, a higher wattage/sq. ft. has to be adopted, but this is difficult to do without diminishing the safety of the blanket or the like. Thermostats incorporated in the blanket as a safety measure are undesirable for four reasons: (a) Their inability to operate efficiently at predetermined temperatures: (b) They require extra joints and connections, which are sources of likely failure: (c) They control a small area only and consequently, to be effective, large numbers of them are needed: and (d) with thermostats incorporated it would be uncomfortable to use the appliance as an under-blanket.

One solution to this problem is to increase the wattage per square foot for a limited amount of time only. This can be done with the aid of a bi-metal element arranged to operate on the principle of a "Simmerstat" (registered trademark) the arrangement being such that the heat source bends the bi-metal element and operates a toggle switch in series with the appliance. If the heat source fails, the blanket is cut out of circuit. The same objective could be achieved with the aid of a miniature motor-timer embodying or comprising a switch which is arranged to close under the influence of centrifugal force. In such case if the motor fails the heating element or elements for the blanket are cut out of circuit.

To regulate the temperature of the appliance, several expedients have been adopted in the past:

(a) The use of two heating elements in series (Low): only one in circuit (Medium): or both elements in parallel (High): all being under control of a line switch. Those known expedients are recognised as the cheapest and consequently they are the most widely used. The disadvantages are that the "High" position is used for pre-heating only: the "Medium" position has only half the elements in circuit, consequently only half of the heating area is actually warmed, and this temperature is still too high and not sufficiently uniform for all-night use: and the "Low" position is the only one for all-night use and still provides a temperature slightly higher than what the average person would require.

(b) The use of a "Simmerstat" arrangement which gives a full range of temperatures but has two big disadvantages: First, the cycle of a "Simmerstat" is between 20 seconds to over one minute with a setting, for instance—of 5 sec. on/60 sec. off. A person lying on a blanket subject to those conditions would feel the warmth for 5 seconds, and the cooling-off period for one minute. Secondly, the ticking of the switch at frequent intervals would aggravate a light sleeper.

(c) The use of a thermostat (or thermostats). This has disadvantage similar to a "Simmerstat" arrangement.

My solution, the subject of the present invention, is to use an electronic control unit to control the energy input to the blanket. This gives a full range of temperatures without the disadvantages of the "Simmerstat" or thermostat arrangements. Switching of the unit on and off is effected many times per second (in accordance with the frequency of the A.C. supply current) and without the slightest noise.

This electronic control unit may use a silicon controlled rectifier or similar device.

The present invention may also involve use of a time switch in parallel with the electronic control unit, so that for the initial heating-up period, said control unit is short circuited; and after the lapse of a predetermined time the short-circuiting switch will open and place the control unit in circuit at the temperature for which it was set at the time when it was switched on, but not higher than a certain percentage of the full wattage consumed when the control unit is short circuited, because the control unit can be designed in such a way that it regulates the input from a low figure to any wattage.

Certain practical applications of the invention are illustrated by the accompanying drawings in which similar references indicate corresponding parts, and wherein.

Figure 3:
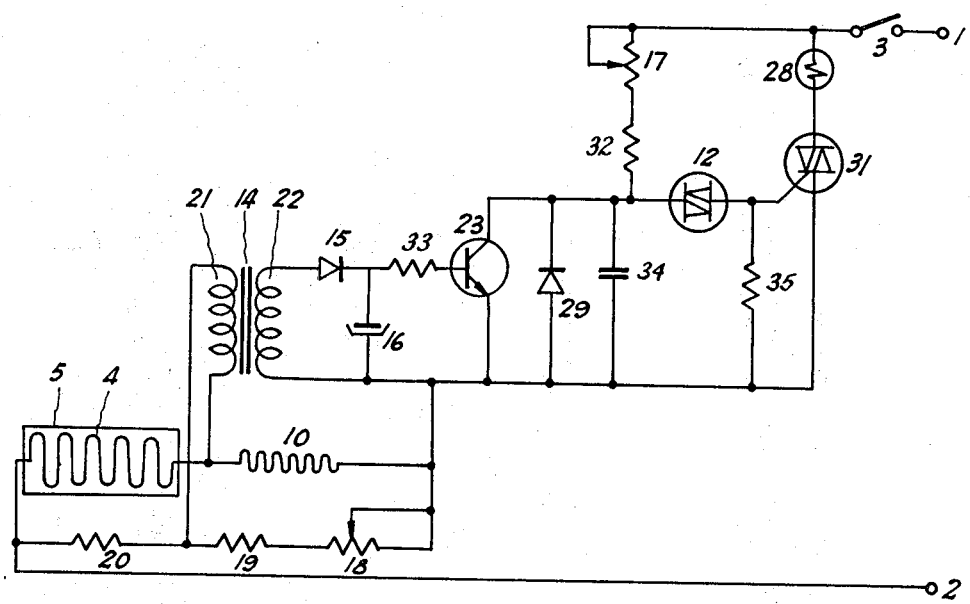
Figure 4:
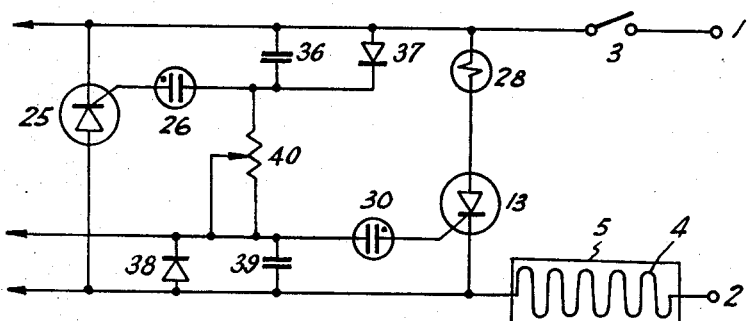
Figure 5:
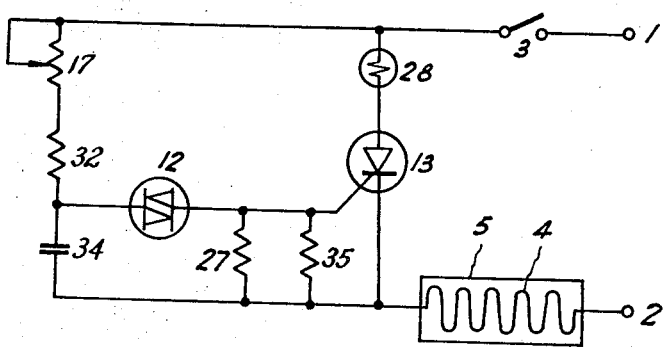

FIG. 3 shows the circuit of a simpler form of the invention wherein there is no limitation upon the wattage per unit area of the blanket in use, FIG. 4 shows the circuit of a modified form of the invention wherein two silicon controlled rectifiers are in opposite phase, and FIG. 5 shows the circuit of another modified form of the invention wherein the conduction angle of a silicon controlled rectifier can be varied.

Figure 1:
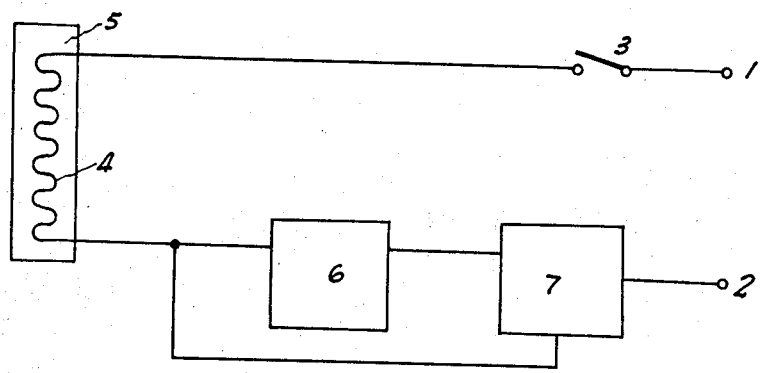
FIG. 1 shows a block diagram of the system as a whole.

Upon referring to the drawings it will be seen that in FIG. 1 an alternating voltage applied between the terminals 1 and 2 may be supplied, upon closing the switch 3, to a heating element 4 in a blanket 5 or the like, via an electronic regulator unit 7, either directly or through an overheat control unit 6.

Figure 2:
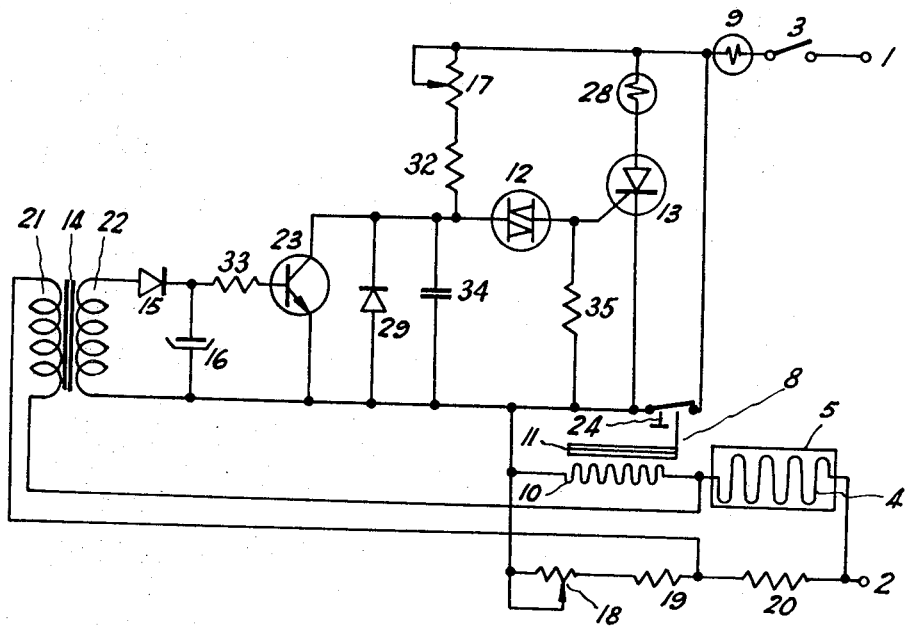
FIG. 2 shows the circuit of one particular embodiment of the invention.

In FIG. 2 illustrating the circuit of one particular embodiment of the invention, said electronic regulator unit (ERU) is connected in parallel with a time switch 8 whose purpose is to short circuit the ERU for a certain period of time (hereinafter called the preheating time or PT). The remaining transistor circuit comprises details of said overheat control unit (hereinafter called the OCU). The purpose of the OCU is to reduce or cut off the flow of current to the blanket 5, or the like, in the case of overheating.

During an initial heating period the abovementioned ERU is over-ridden for a time PT and the full wattage is applied to the blanket 5 when the switch 3 is closed, and a circuit is thus completed through the lamp 9 and the time switch 8. During this time the lamp 9 serves as an indicating device and also as a safety fuse.

The current which heats the heating element 4 of the blanket also heats the control element 10, which eventually causes bending of the bi-metallic strip 11, thereby opening the initially closed contacts of the switch 8. In order to ensure that this initial period of heating cannot be extended either by accident or design, means are provided whereby after the lapse of a predetermined time, the ERU is connected in the circuit so as to regulate the power input to the blanket element 4 to a value set at the time of switching in the ERU, or to any value set later, this last-mentioned value not being higher than a predetermined percentage of the full wattage consumed when the ERU was over-ridden. In this respect the ERU may be designed in such a manner that it regulates the input to the blanket from a low value to any desired wattage. Furthermore, in this regulated stage of heating, means for indicating and protecting against excessive current is provided in the form of the lamp 28 which, as well as constituting a fuse, indicates by its brightness the magnitude of the input to the load constituted by the blanket heating element 4.

An additional safety feature according to this embodiment of the invention is the means provided to protect the blanket 5 against overheating of even a small fraction of its total area during the regulated period of heating.

In this respect the blanket is assumed to be constructed from such materials that a rise in its temperature will cause a change in the resistance of the element 4. Means are provided whereby a signal resulting from said change is fed from the OCU to the ERU, which results in a lowering of the power input and hence causes cooling of the blanket to a predetermined safe temperature.

Every time the apparatus is switched off, the contacts of switch 3 open, but the contacts of switch 8 close so preparing the apparatus for the preheat time. When the apparatus is switched on, the contacts of switch 3 close and, with the contacts of switch 8 already closed, the blanket or the like receives the full power input and the lamp 9 indicates that the initial heat is on and simultaneously acts as a fuse. After a predetermined time, the bi-metallic strip 11 opens the contacts of switch 8 (but the contacts of switch 3 remain closed until the apparatus is switched off) and with the ERU in circuit, the power input and thus the heat generated in the blanket can be regulated from half power to zero.

In this circuit the ERU comprises the silicon controlled rectifier 13, which has a bi-directional trigger diode or Diac 12 for triggering. If desired the Diac could be replaced by a neon discharge lamp. During the time of heat regulation, the brightness of the lamp 28 gives an indication of the power being dissipated in the load supplied by the circuit. Lamp 28 also constitutes a fuse.

As switches 3 and 8 are ganged it is not possible to close the switch 8 unless the switch 3 is turned off and then turned on again. If this is done when the element 10, and hence the bi-metallic strip 11, is still sufficiently hot, the switch 8 reopens immediately, thus preventing extension of the time of preheating.

Thus it will be seen that when the switch 8 is open, the silicon controlled rectifier 13 and the bi-directional control diode (Diac) 12 is in circuit. The firing angle of SCR 13 is controlled by the RC circuit made up of potentiometer 17, resistor 32, and capacitor 34. The potentiometer 17 is provided so that a suitable position of its tap determines the conduction angle of the SCR, and hence affects the power delivered to the blanket heating element 4. Resistor 35 is the gate resistor for SCR 13.

The heating element 4 is preferably constructed from nickel wire or similar material. The potentiometer 18 is provided to balance the bridge circuit constituted by the resistors 19 and 20 and by the two heating elements 10 and 4. Thus the potentiometer 18 is preset so that the bridge, when balanced, insures normal operating conditions for the blanket and is then left in the preset condition. It will be seen also that any rise of temperature of the blanket will, in the case of a heating element material having a positive resistance characteristic, cause the resistance of said element to increase. As the blanket tends to reach an excessive temperature the balance of the bridge will be upset sufficiently so that a potential applied from the bridge to the primary winding 21 of the transformer 14 causes a voltage to be induced in the secondary winding 22, thus applying current to the base of the transistor 23. Diode 15 and capacitor 16 provide rectification and filtering of the AC voltage induced in secondary 22 for application to base resistor 33 to bias transistor 23. The output from the emitter of said transistor is then applied to the silicon controlled rectifier 13 across diode 29 and capacitor 34 so that the power input controlled by 13 is lowered and causes cooling of the blanket.

Any time during the preheat period, the preheaing can be cancelled by the cancel button 24 which will open the contacts of switch 8 thus placing the ERU in the circuit.

A modification of the invention is shown in the arrangement illustrated in FIG. 3 which may be employed in the simpler case whre there is no requirement for preheating. This circuit which employs a so-called Triac 31 instead of the silicon controlled rectifier, has no means for shorting said triac, and can regulate the power input to the heating element 4 from full power to zero.

A further modification of the invention is shown in FIG. 4 where, for simplicity, only the ERU circuit is included. In this case, two silicon controlled rectifiers 13 and 25 are employed in opposite phase instead of the Triac 31 of FIG. 3. In this case the silicon controlled rectifiers 13 and 25 are provided with neon discharge lamps 30 and 26 corresponding to the Diac 12. Diodes 37 and 38 protect the gates of the SCR's 25 and 13 respectively, during the negative half cycle. The firing angle of SCR 13 is determined by the RC time constant of capacitor 39 and potentiometer 40. The firing angle of SCR 25 is determined by the RC time constant of capacitor 36 and potentiometer 40.

A further modification of the arrangement of FIG. 4 is shown in FIG. 5 wherein the critical temperature resistor may be given either a positive or negative temperature coefficient of resistance. The CTR such as that shown at 27, should be distributed throughout the blanket 5 in the same manner as the heating element 4. The value of the CTR 27 is critical, since, if increased sufficiently, it will cut off said silicon controlled rectifier.

What is claimed is:
1. A temperature control system for an electrically heated blanket or the like, comprising in combination,
 a source of current,
 a heating element disposed within said blanket,
 electronic control means adapted to supply said current intermittently to said heating element,
 said electronic control means comprising an electronic current regulator, manually settable for a desired temperature,
 a normally balanced bridge circuit connected to said electronic current regulator, one arm of said bridge including said heating element,
 the current supplied by said electronic current regulator being reduced by an unbalanced condition in said bridge circuit, time-switch means to short-circuit said electronic control means, and temperature sensing means to open said last-named means when said blanket reaches a predetermined temperature.

2. A temperature control system as claimed in claim 1, wherein said electronic control means comprises at least one silicon controlled rectifier which sets an upper limit to the current supplied to said heating element during the time when the latter is regulated by said electronic control means.

3. A temperature control system as claimed in claim 1, wherein said time-switch comprises a bi-metallic element adapted to be heated by a control element.

4. A temperature control system as claimed in claim 1 wherein, during said initial preset time, the current supplied to said heating element passes through a lamp which constitutes a current level indicating device and also a safety fuse.

5. A temperature control system as claimed in claim 2 wherein said silicon controlled rectifier is triggered by a Diac.

6. A temperature control system as claimed in claim 2 wherein said silicon controlled rectifier is triggered by a neon discharge lamp.

7. A temperature control system as claimed in claim 2 wherein said silicon controlled rectifier is replaced by a Triac.

8. A temperature control system as claimed in claim 2 wherein said silicon controlled rectifier is replaced by a pair of said silicon controlled rectifiers connected in phase opposition.

References Cited

UNITED STATES PATENTS

| | | | |
|---|---|---|---|
| 3,385,958 | 5/1968 | Lauck | 219—212 X |
| 3,422,244 | 1/1969 | Lauck | 219—212 |
| 3,426,441 | 2/1969 | Broski | 219—505 X |
| 3,437,792 | 4/1969 | Lauck | 219—505 |
| 2,993,979 | 7/1961 | Hornsby | 219—212 |
| 3,370,120 | 2/1968 | Lasch | 219—494 |

FOREIGN PATENTS 669,400   4/1952   Great Britain.

VOLODYMYR Y. MAYEWSKY, Primary Examiner

U.S. Cl. X.R.

219—212, 505